(12) United States Patent
Harries

(10) Patent No.: US 6,595,336 B2
(45) Date of Patent: Jul. 22, 2003

(54) HYDRAULIC ACTUATION SYSTEMS

(75) Inventor: David Anthony Harries, Stratford upon Avon (GB)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/982,692

(22) Filed: Oct. 18, 2001

(65) Prior Publication Data

US 2002/0046913 A1 Apr. 25, 2002

(30) Foreign Application Priority Data

Oct. 21, 2000 (GB) .............................................. 0025847

(51) Int. Cl.[7] .............................................. B60K 41/22
(52) U.S. Cl. ...................................... 192/3.58; 74/335
(58) Field of Search .......................... 192/3.58; 74/335; 477/79

(56) References Cited

U.S. PATENT DOCUMENTS

| | | | | |
|---|---|---|---|---|
| 2,732,727 A | * | 1/1956 | Livermore ................... | 477/124 |
| 2,753,726 A | * | 7/1956 | Harris ......................... | 74/334 |
| 3,834,499 A | * | 9/1974 | Candellero et al. ........ | 192/3.58 |
| 4,653,352 A | * | 3/1987 | Nakao et al. ................ | 74/335 |
| 4,719,812 A | * | 1/1988 | Machida et al. ............. | 74/335 |
| 5,105,922 A | * | 4/1992 | Yant ............................ | 192/3.58 |
| 5,167,311 A | * | 12/1992 | Satoh et al. ................. | 192/3.58 |
| 5,697,251 A | * | 12/1997 | Lorriette et al. ............. | 74/335 |
| 5,992,590 A | * | 11/1999 | Harries ....................... | 192/3.58 |
| 6,102,829 A | * | 8/2000 | Muddell et al. ............ | 192/3.58 |
| 6,116,391 A | * | 9/2000 | Kremmling et al. ........ | 192/3.58 |

* cited by examiner

Primary Examiner—Rodney H. Bonck
(74) Attorney, Agent, or Firm—Darby & Darby

(57) ABSTRACT

A hydraulic actuation system for an automated transmission system including, a hydraulic clutch actuator (22) for controlling engagement of a clutch (14), a gear engagement actuator (114,115) for controlling engagement of a gear, said gear engagement actuator (114,115) being in the form of a double acting ram having first and second working chambers (118,119) acting on opposite sides of a piston (116,117), a main control valve (120), the main control valve (120) selectively connecting the clutch actuator (22) and/or the gear engagement actuator (114,115) to an accumulator (275) or to a reservoir (278); a gear engagement control valve (144,146) selectively connecting the first and second working chambers (118,119) of the gear engagement actuator (114,115) to the main control valve (120) or to the reservoir (278); an electrically driven pump (223) being provided to charge the accumulator, the pressure of fluid supplied by the pump being controlled by variation of the current driving the pump (223).

12 Claims, 5 Drawing Sheets

HYDRAULIC ACTUATION SYSTEMS

This invention relates to hydraulic actuation systems and in particular hydraulic actuation systems for automated transmission systems. In this context automatic transmission systems include mechanisms and/or methods for the controlled, automated actuation of the clutch and/or gears in the drive train of motor vehicles.

In automated transmission systems of, for example, the type disclosed in WO97/05410 or WO97/40300, whose content is expressly incorporated in the disclosure content of the present application, fluid pressure actuators are used to control actuation of a clutch actuator mechanism and/or a gear engaging mechanism. In accordance with WO97/05410, separate control valves are used to control the clutch actuator mechanism and the gear engaging mechanism.

WO97/40300 discloses a hydraulic actuation system in which a main control valve controls both the clutch actuation mechanism and, together with secondary valves, shift and select actuators of a gear engaging mechanism. The use of a single main control valve in this manner reduces the number of components, providing savings in the overall size and cost of the system. The design of the master control valve is however significantly more complicated, which reduces the cost savings.

Hitherto, hydraulic pressure for clutch actuation and for shifting gears has been supplied from a gas accumulator which is charged by means of an electrically driven pump. The accumulator provides an immediate supply of pressurised fluid, to disengage the clutch, upon initiation of a gear change. The use of an accumulator also enables the use of a smaller pump.

Typically the pressure required to operate the clutch will be of the order of 30 bar while the pressure required for gear shifting may be as high as 60 bar, but will generally be about 20 bar. However, in order to store sufficient volume for clutch actuation and shifting of gears, pressure in the accumulator must be as high as 60 bar. The pump has consequently to work at 60 bars to charge the accumulator in order to store the required volume of fluid.

Moreover, it is desirable during the shifting of gears to vary the force applied to the shift actuator, when, for example, engaging the syncromesh. This has been achieved hitherto by using a pressure transducer to measure the pressure of fluid supplied to the shift actuator and modulating the flow of fluid into the system using separate proportional flow control valves to maintain the correct pressure.

In accordance with one aspect of the present invention, a hydraulic actuation system for an automated transmission system comprises;

- a hydraulic clutch actuator for controlling engagement of a clutch;
- a gear engagement actuator for controlling engagement of a gear;
- an accumulator;
- an electric motor driven pump, an output of the motor driven pump being connected to the accumulator for charging thereof via a non-return valve, the pressure of fluid supplied by the pump being controlled by the current supplied to the electric motor; and
- a main control valve for selectively connecting the accumulator to the hydraulic clutch actuator and/or the gear engagement actuator.

In this manner hydraulic fluid under pressure will immediately be available from the accumulator for disengagement of the clutch. Pressure of fluid to the gear engagement actuator may then be controlled by the pump. As a consequence the volume and/or pressure of the accumulator may be reduced. Furthermore the pressure supplied to the gear engagement actuator may be modulated by the pump, avoiding the need for flow control valves and the control system associated therewith.

According to a preferred embodiment of the invention a spring accumulator is used. The spring accumulator will also provide consistent compliance in the system enabling accurate pressure control.

A pressure transducer may also be included in the system and used in a closed feedback loop to control the pump to deliver the required pressure.

The invention is now described by way of example only, with reference to the accompanying drawings, in which.

Figure 1:
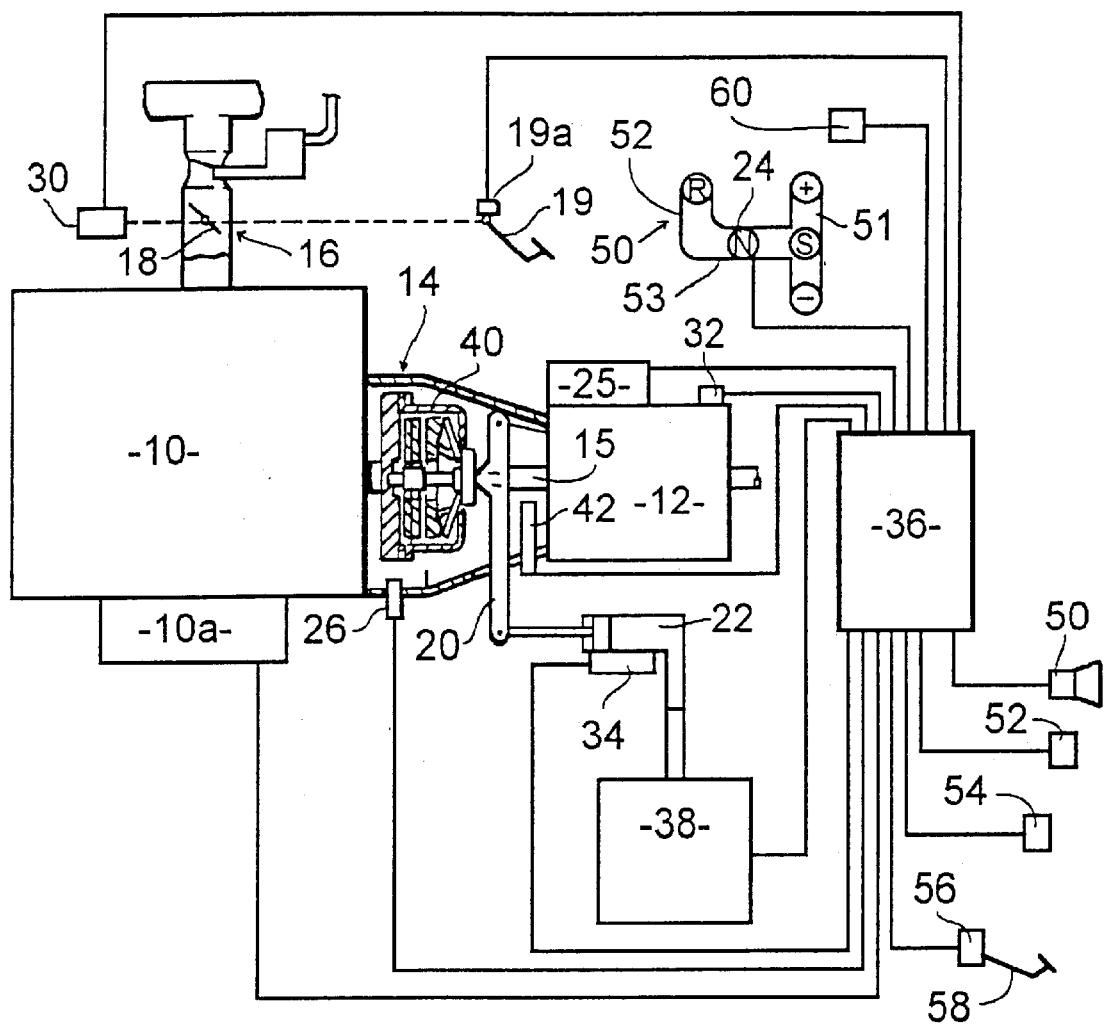
FIG. 1 shows diagrammatically a semi-automated transmission system utilising a hydraulic actuation system in accordance with the present invention.

FIG. 1 of the accompanying drawings shows an engine 10 with a starter and associated starter circuit 10a which is coupled through the main drive friction clutch 14 to a multi-speed synchromeshed lay shaft-type gearbox 12, via a gearbox input shaft 15. Fuel is supplied to the engine by a throttle 16 which includes a throttle valve 18, operated by accelerator pedal 19. The invention is equally applicable to electronic or mechanical fuel injection petrol or diesel engine.

The clutch 14 is actuated by a release fork 20 which is operated by a hydraulic slave cylinder 22, under the control of a clutch actuator control means 38.

A gear selector lever 24 operates in a gate 50 having two limbs 51 and 52 joined by a cross track 53 extending between the end of limb 52 and intermediate of the ends of limb 51. The gate 50 defines five positions; "R" at the end of limb 52; "N" intermediate of the ends of the cross track 53; "S" at the junction of limb 51 with the cross track 53; and "+" and "−" at the extremities of limb 51. In limb 51 the lever 24 is biased to the central "S" position. The "N" position of the selector lever 24 corresponds to neutral; "R" corresponds to selection of reverse gear; "S" corresponds to selection of a forward drive mode; momentary movement of the lever to the "+" position provides a command to cause the gearbox to shift up one gear ratio; and momentary movement of the gear lever 24 to the "−" position provides a command to cause the gearbox to shift down one gear ratio.

The positions of the lever 24 are sensed by a series of sensors, for example micro switches or optical sensors, positioned around the gate 50. Signals from the sensors are fed to an electronic control unit 36. An output from the control unit 36 controls a gear engaging mechanism 25, which engages the gear ratios of the gearbox 12, in accordance with movement of the selector lever 24 by the vehicle operator.

In addition to signals from the gear selector lever 24, the control unit 36 receives signals from:

sensor 19a indicative of the degree of depression of the accelerator pedal 19;

sensor 30 indicative of the degree of opening of the throttle control valve 18;

sensor 26 indicative of the engine speed;

sensor 42 indicative of the speed of the clutch driven plate; and sensor 34 indicative of the clutch slave cylinder position.

The control unit 36 utilises the signals from these sensors to control actuation of the clutch 14 during take-up from rest and gear changes, for example as described in patent specifications EP0038113, EP0043660, EP0059035, EP0101220 and WO92/13208 whose content is expressly incorporated in the disclosure content of the present application.

In addition to the above mentioned sensors, control unit 36 also receives signals from a vehicle speed sensor 52, ignition switch 54 and brake switch 56 associated with the main braking system, for example the footbrake 58 of the vehicle.

A buzzer 50 is connected to the control unit 36 to warn/indicate to the vehicle operator as certain operating conditions occur. In addition or in place of the buzzer 50 a flashing warning light or other indicating means may be used. A gear indicator 60 is also provided to indicate the gear ratio selected.

Figure 2:
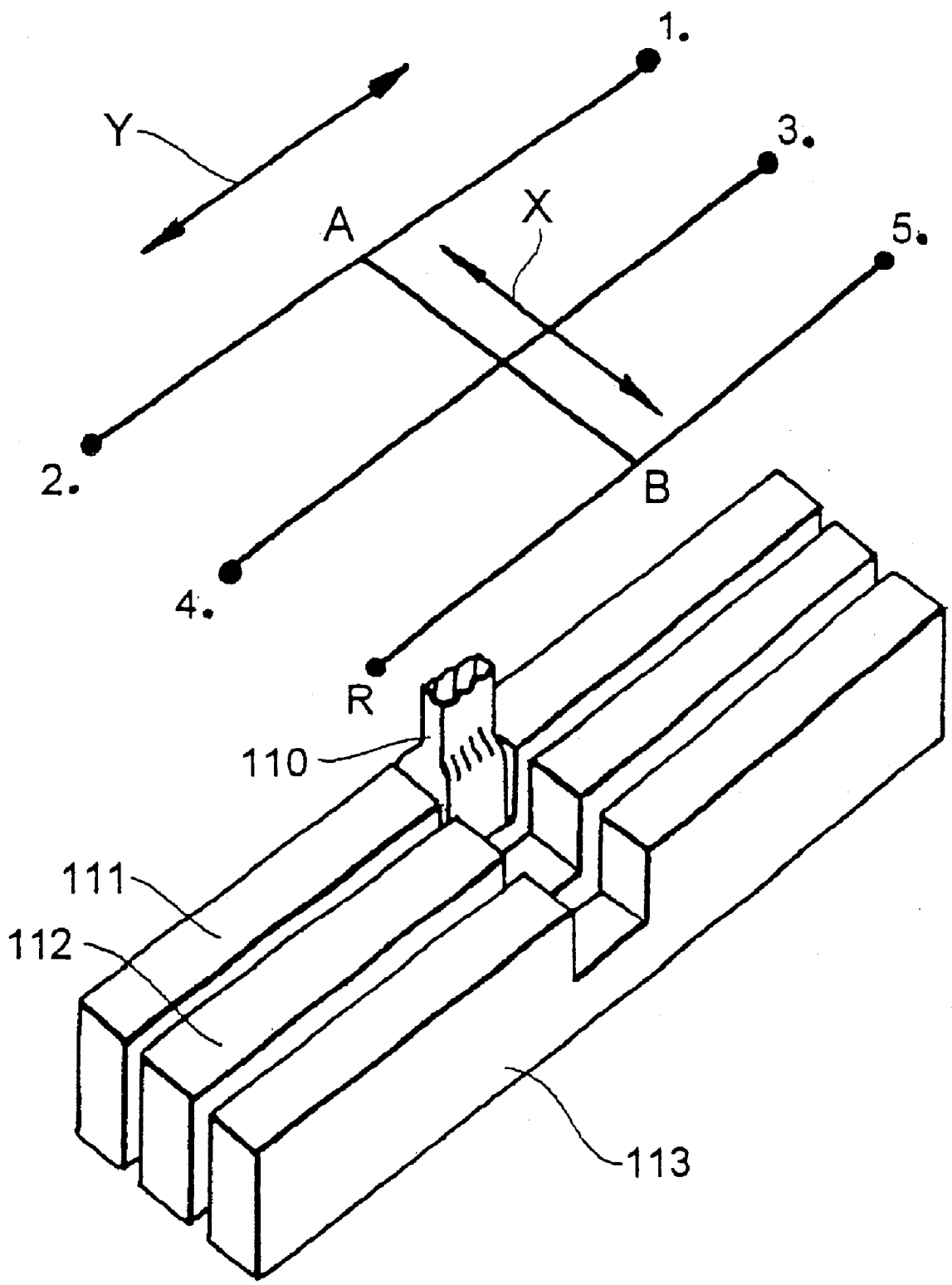
FIG. 2 shows a gear selector mechanism and associated selector gate of the transmission system illustrated in FIG. 1.

As illustrated in FIG. 2, the gear engagement mechanism 25 comprises three shift rails 111, 112, 113 mounted parallel to one another for movement in an axial direction. Each shift rail 111, 112, 113 is associated with two of the gear ratios of the gearbox 12, via a selector fork and synchromesh unit in conventional manner, so that movement of the shift rails 111, 112, 113 in one axial direction will cause engagement of one of the associated gear ratios and axial movement of the shift rail 111, 112, 113 in the opposite axial direction will cause engagement of the other associated gear ratio.

Typically; first and second gear ratios are associated with shift rail 111, so that axial movement of the shift rail 111 in a first direction will engage first gear or axial movement of shift rail 111 in a second direction will engage second gear; third and fourth gear ratios are associated with shift rail 112, so that axial movement of shift rail 112 in the first direction will engage third gear or axial movement of shift 112 in a second direction will engage fourth gear; and fifth and reverse gear ratios are associated with shift rail 113, so that axial movement of shift rail 113 in the first direction will engage fifth gear while axial movement of shift rail 113 in the second direction will engage reverse gear.

A selector member 110 is mounted for movement in a select direction X transverse to the axes of the shift rails 111, 112, 113 and in a shift direction Y, for movement axially of the shift rails 111, 112, and 113. The selector member 110 may thus be moved in direction X along a neutral plane A–B, so that it may be indexed with and engaged a selected one of the shift rails 111, 112, and 113. The selector member 110 may then be moved in direction Y to move the engaged shift rail 111, 112, 113 axially in either direction to engage one of the gear ratios associated therewith.

Figure 3:
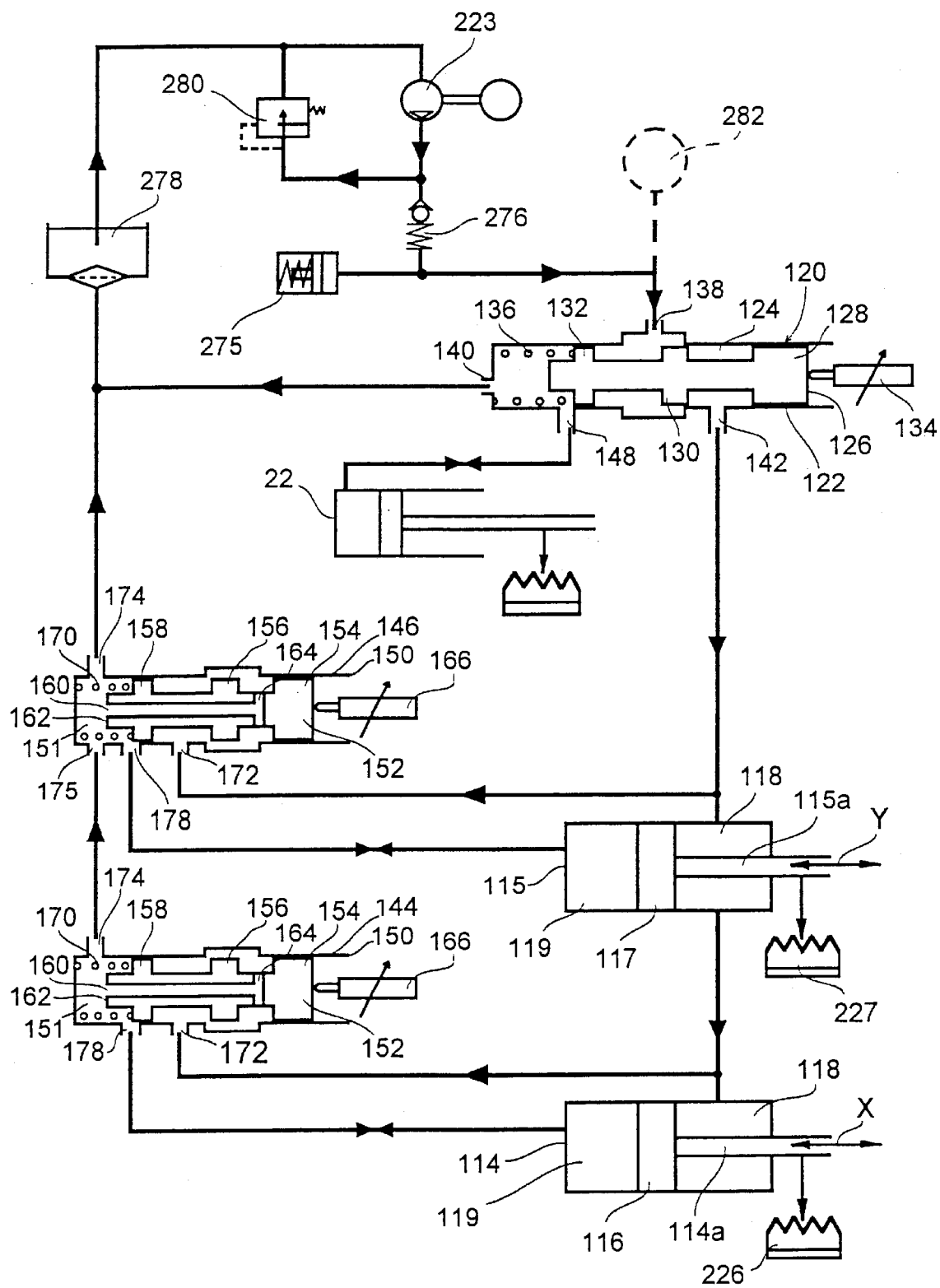
FIG. 3 illustrates diagrammatically the hydraulic actuation system of the transmission system illustrated in FIG. 1.

As illustrated in FIG. 3, selector member 110 is movable in the select direction X by means of a fluid pressure operated select actuator 114, along the neutral plane A-B of the gate illustrated in FIG. 2, to align the select member 110 with one of the shift rails 111, 112, 113 , and thereby select a pair of gears associated with that shift rail. The selector member 110 may then be moved in the shift direction Y by means of a fluid pressure operated shift actuator 115, to move the shift rail 111, 112, 113 axially in either direction to engage one of the gear ratios associated therewith.

The actuators 114 and 115 each comprise a double-acting ram having pistons 116, 117 respectively, which divide the actuators 114, 115 into two working chambers 118, 119, the working chambers 118, 119 being disposed on opposite sides of each of the pistons 116, 117. Operating rods 114a, 115a extend from one side of the pistons 116, 117 respectively and are operatively connected with the selector member 110 for movement thereof in the select and shift directions X and Y respectively. As a consequence of the connection of operating rods 114a, 115a to the pistons 116, 117, the working area of pistons 116, 117 exposed to working chamber 118 is smaller than the working area of pistons 116, 117 exposed to working chamber 119.

A solenoid operated main control valve 120 comprises a housing 122, defining a bore 124. A spool 126 is slideably located in the bore 124, the spool 126 having three axially spaced circumferential lands 128, 130, 132 which sealingly engage the bore 124. A solenoid 134 acts on one end of the spool 126, so that upon energisation of the solenoid 134, the spool 126 is moved axially of the bore 124 against a load applied by a compression spring 136, acting on the opposite end of the spool 126.

An inlet 138 to the bore 124 of valve 120 is connected to a spring accumulator 275. An electrically-driven pump 223 is provided to charge the accumulator 275 via a non-return valve 276. An outlet 140 from the bore 124 is connected to a reservoir 278. A first port 142 from bore 124 is connected to working chambers 118 of the select and shift actuators 114, 115 and selectively to working chambers 119 via select and shift valves 144, 146 and a second port 148 is connected to the clutch slave cylinder 22. A pressure relief valve 280 is provided between the outlet of the pump 223 and the reservoir 278, to ensure that the pressure supplied by the pump 223 does not exceed a minimum predetermined value.

The shift and select valves 144, 146 are both solenoid operated valves having a housing 150 defining a bore 151 with a spool 152 slideably mounted in the bore 151. The spool 152 has three axially spaced circumferential lands 154, 156, 158, the lands sealingly engaging the bore 151. An axial bore 160 opens to end 162 of the spool 152 and connects to a cross-bore 164, the cross-bore 164 opening between lands 154 and 156 of the spool 152. A solenoid 166 acts on end 168 of spool 152 remote from the end 162, so that upon energisation of the solenoid 166, the spool 152 will move axially of the bore 151 against a load applied by a compression spring 170 acting on end 162 of the spool 152.

An inlet 172 to the bore 151 is connected to port 142 of the main control valve 120. An outlet 174 from the bore 151 is connected to the reservoir 278. Port 178 of the select valve 144 is connected to the second working chamber 119 of the select actuator 114 and port 178 of shift valve 146 is connected to the second working chamber 119 of shift actuator 115.

Figure 7:
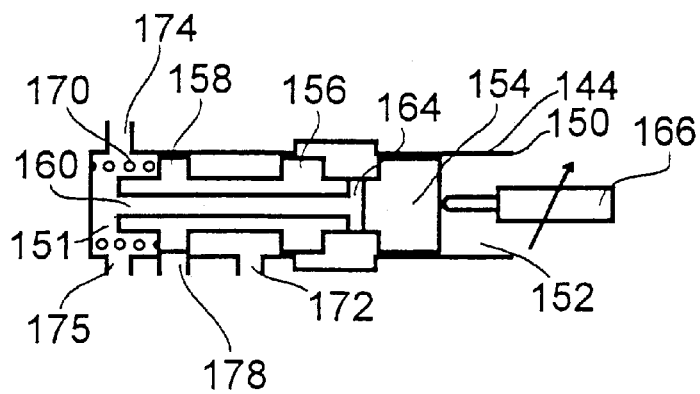
FIG. 7 shows a sectional diagrammatic illustration of the gear shift control valve of the hydraulic actuation system illustrated in FIG. 3, in an energised null position.
Figure 8:
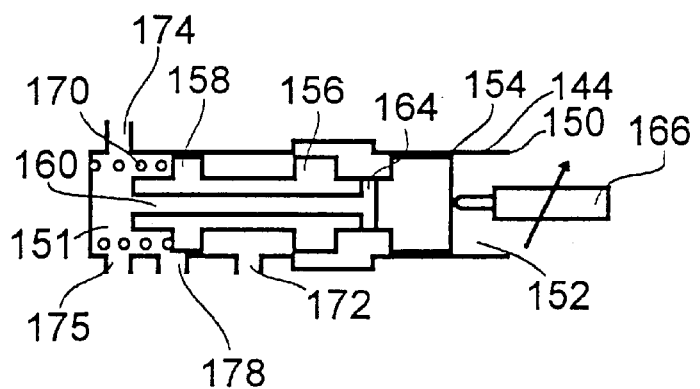
FIG. 8 shows a view similar to FIG. 7 with the gear shift control valve in an energised third position.
Figure 9:
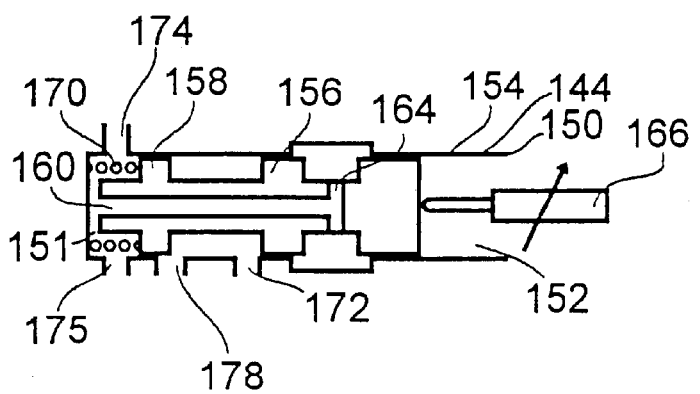
FIG. 9 shows a view similar to FIG. 7 of the gear shift control valve in an energised fourth position.

The construction and operation of the valves 144 and 146 and actuators 114 and 115 are identical as illustrated in FIGS. 7 to 9.

When the transmission is in gear and the clutch 14 engaged, the solenoids 134 and 166 will be de-energised and valves 120, 144 and 146 will be in the rest positions illustrated in FIG. 3. In this position, the clutch slave cylinder 22 is connected via port 148 and outlet 140 of the main control valve 120 to the reservoir 278; the working chambers 118 of the select and shift actuators 114, 115 will be connected to the reservoir 278 via inlet 172, passageways 164, 160 and outlet 174 of the select and shift valves 144, 146; and working chambers 119 of the select and shift actuators 114, 115 will be connected to the reservoir 278 via port 178 and outlet 174 of the select and shift valves 144, 146. There will consequently be no movement of the clutch slave cylinder 22 or select and shift actuators 114, 115.

Figure 4:
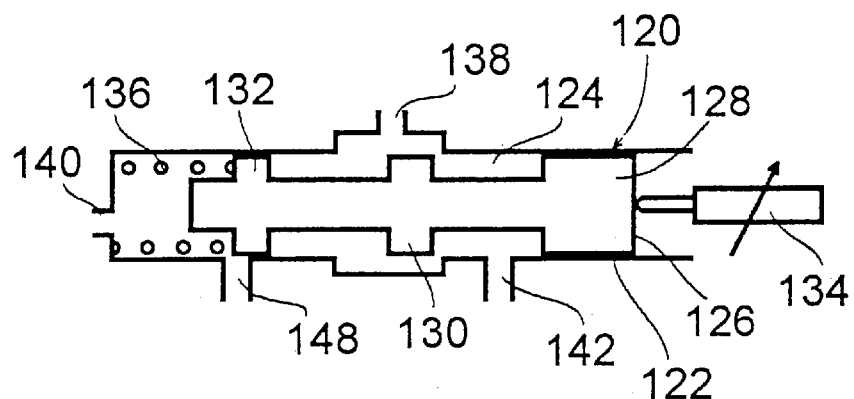
FIG. 4 shows a sectional diagrammatic illustration of the main control valve of the hydraulic actuation system illustrated in FIG. 3, in an energised second position.

When a gear change is initiated by, for example, the driver of the vehicle moving the gear selector lever 24 momentarily to the '+' position, or by automatic initiation, solenoid 134 is energised to move the spool 126 of main control valve 120 to a second position, as illustrated in FIG. 4. In this second position the working chambers 118 of both the select and shift actuators 114, 115, and inlets 172 of the select and shift valves 144, 146 are connected to the spring accumulator 275, via port 142 and inlet. In this second position the clutch slave cylinder 22 remains connected to the reservoir 278.

Simultaneously, with energisation of solenoid 134 to move the main control valve 120 to the second position illustrated in FIG. 4, solenoids 166 of the select and shift control valves 144, 146 are energised to move the spool 152 to a null position as illustrated in FIG. 7. In this position, the land 158 of spool 152 closes port 178 thereby closing working chamber 119 and creating a hydraulic lock preventing movement of the select and shift actuators 114 and 115, even though working chambers 118 thereof are connected to the spring accumulator 275 by the 144, 146 and the main control valve 120. The connection of port 172 to the outlet 174 via bores 160 and 164 of the select and shift valves 144, 146, is also closed.

Figure 5:
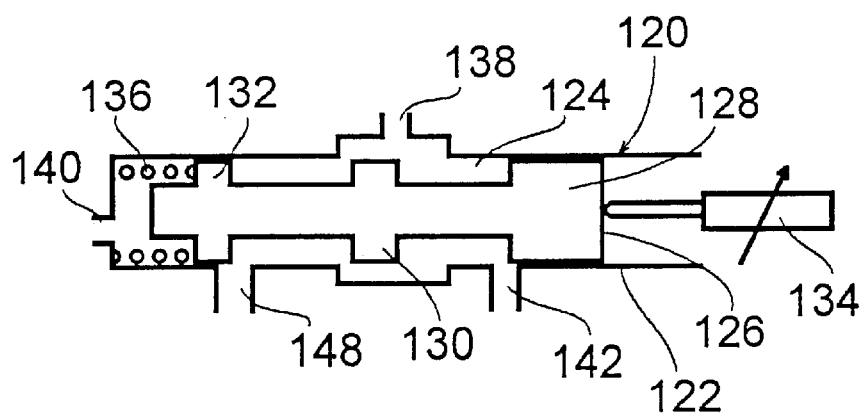
FIG. 5 shows a view similar to FIG. 4 of the main control valve in an energised third position.

Further energisation of the solenoid 134 to the third position illustrated in FIG. 5 will then close the connection between the clutch slave cylinder 22 and the reservoir 278 and open the connection between the clutch slave cylinder 22 and the spring accumulator 275, actuating the release fork 20 to disengage the clutch 14.

Figure 6:
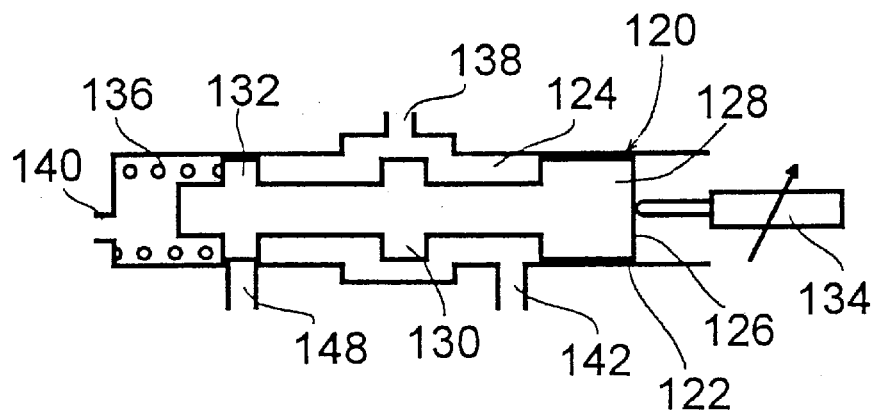
FIG. 6 shows a view similar to FIG. 4 of the main control valve in an energised fourth position.

Upon disengagement of the clutch 14, solenoid 134 of the main control valve 120 may be energised to move the main control valve back to a fourth position, as illustrated in FIG. 6. In this fourth position, the port 148 is isolated from the inlet 138 and the outlet 140, so that the clutch 14 will be clamped in the disengaged position. The solenoids 166 of the select and shift valves 144, 146 may then be selectively energised, moving the select and shift valves 144, 146 between third and fourth positions, in order to disengage the currently selected gear and engage a new gear.

Energisation of solenoid 166 to move the select or shift valve 144, 146 to the third position illustrated in FIG. 8, in which working chamber 119 is connected to reservoir 278, while working chamber 118 is connected to the accumulator 275, will create a pressure differential across the pistons 116 and 117, causing the operating rod 114a, 115a to extend. Energisation of solenoid 166 to move the select or shift valve 144, 146 to the fourth position illustrated in FIG. 9, in which both working chambers 118 and 119 are connected to the accumulator 275, will cause the operating rods 114a, 115a to retract, due to the differential working areas of the pistons 116 and 117. Consequently, by appropriate control solenoids 166 of the select and shift valves 144, 146, the selector member 110 may be moved to engage the desired gear.

Potentiometers 226 and 227 are connected to the operating rods 114a, 115a respectively, to provide signals indicative of the position of the associated operating rods. Signals from the potentiometers 226, 227 are fed to the control unit 36 to provide an indication of the position of the operating rods 114a, 115a for each of the gear ratios of the gear box 12 and also to indicate the position of the operating rod 115a, when the select member 110 is in the neutral plane A–B of FIG. 2. The transmission system may thus be calibrated, so that predetermined position signals from the potentiometers 226 and 227 correspond to engagement of each of the gear ratios of the gear box 12.

Measurements from the potentiometers 226 and 227 may thus be used by a closed loop control system to control valves 144 and 146, to move the operating rods 114a and 115a, to the predetermined positions to engage the desired gear ratio.

When the desired gear ratio has been engaged, the solenoids 166 of the select and shift valves 144, 146 are energised to move the valves 144, 146 back to their null positions, closing the ports 178 and creating a hydraulic lock preventing movement of the actuators 114, 115.

Solenoid 134 of the main control valve 120 may then be energised to move the main control valve 120 from its fourth to its second position, thereby allowing fluid from the clutch slave cylinder 22 to be returned to the reservoir 278, permitting re-engagement of the clutch 14. The main control valve 120 may be switched between the third and second positions, so that the clutch 14 is re-engaged in controlled manner, for example as disclosed in EP0038113; EP0043660; EP0059035; EP0101220 or WO92/13208.

When the clutch 14 has been re-engaged, solenoid 134 of the master control valve 120 may be de-energised, so that it returns to the rest position illustrated in FIG. 3. Similarly the solenoids 166 of the shift and select valves 144, 146 may be de-energised. Movement of the select and shift valves 144, 146 to the rest position illustrated in FIG. 3 will open working chamber 119 to reservoir 278, thereby releasing pressure therein.

During the gear selection with the main control valve 12 in the fourth position, illustrated in FIG. 6, the force applied by the select and shift actuators 114, 115 may be controlled by controlling the pressure of fluid applied by the pump 223, which is in turn controlled by the pump motor current, using pulse width modulation. Consequently, the pressure may be varied depending on the type of change required, for example a fast change or slow change; the gear step concerned; and whether it is a change-up or change-down. Furthermore the pressure, particularly to the shift actuator 115 may be varied during a gear change, for example to vary the force applied during the run-up; synchronisation; shift-through; and down-in phases of the gear change. In particular the loads applied during the synchronisation may be reduced in order to wear on the sunchromeshes.

According to a preferred embodiment of the invention, the bores 124 and 151 of the main control valve 120 and the select and shift valves 144, 146 and also of the select and shift actuators 114, 115 may be defined by a common housing, the bores 124, 151 of the various components being appropriately inter-connected by passages through the common housing. The valve/actuator pack so formed would be mounted on or adjacent the gearbox 12.

The electrically driven pump 223, accumulator 275, reservoir 276 and control unit 36 may also be mounted with the valve/actuator pack or may be mounted remotely thereof and inter-connected thereto by, for example, elastomeric pressure hoses.

Various modifications may be made without departing from the invention. For example, while in the above embodiment the hydraulic circuit has been described with reference to a semi-automated transmission system, the invention is equally applicable to fully-automated transmission systems or to automated manual transmission systems.

While in the above the pressure delivered by the pump 223 is controlled by the pump motor current, a pressure transducer 282 as illustrated in broken line in FIG. 3 may optionally be included in the gear engagement system (114, 115, 144, 146), said pressure transducer 282 being used, in a closed loop feedback control system, to provide accurate control of the pressure.

Moreover while in the embodiment described above the clutch slave cylinder 22 is connected directly to the main control valve 120, a remote displacement valve with position sensing means of the type disclosed in EP 0702760 whose content is expressly incorporated in the disclosure content of the present application, may be interposed between the main control valve 120 and clutch slave cylinder 22.

The patent claims submitted with the application are proposed formulations without prejudice to the achievement of further patent protection. The applicant reserves the right to submit claims for further combinations of characteristics, previously only disclosed in the description and/or drawings.

References back used in sub-claims refer to the further development of the subject of the main claim by the characteristics of the respective sub-claim; they are not to be understood as a waiver with regard to achieving independent item protection for the combination of characteristics in the related sub-claims.

Since the subject of the sub-claims can form separate and independent inventions with reference to the prior art on the priority date, the applicant reserves the right to make them the subject of independent claims or of division declarations. Furthermore, they may also contain independent inventions which demonstrate a design which is independent of one of the objects of the preceding sub-claims.

The embodiments are not to be considered a restriction of the invention. Rather, a wide range of amendments and modifications is possible within the scope of the current disclosure, especially those variations, elements and combinations and/or materials which, for example, the expert can learn by combining individual ones together with those in the general description and embodiments in addition to characteristics and/or elements or process stages described in the claims and contained in the drawings with the aim of solving a task thus leading to a new object or new process stages or sequences of process stages via combinable characteristics, even where they concern manufacturing, testing and work processes.

What is claimed is:

1. A hydraulic actuation system for an automated transmission system comprising:
    a hydraulic clutch actuator for controlling engagement of a clutch;
    a great engagement actuator for controlling engagement of a gear;
    an accumulator:
        an electric motor driven pump, an output of the motor driven pump being connected to the accumulator for charging thereof via a non-return valve, the pressure of fluid supplied by the pump being controlled by the current supplied to the electric motor; and
        a main control valve for selectively connecting the accumulator to the hydraulic clutch actuator and/or the great engagement actuator;
    wherein the main control valve is movable between:
        a) a first position in which the clutch actuator is connected to the reservoir and connection of the gear engagement actuator to the accumulator is closed;
        b) a second position in which the clutch actuator is connected to the reservoir and the gear engagement actuator is connected to the accumulator;
        c) a third position in which both the clutch actuator and gear engagement actuator are connected to the accumulator; and
        d) a fourth position in which the clutch actuator is isolated from both the accumulator and the reservoir, and the gear engagement actuator is connected to the accumulator.

2. A hydraulic actuation system according to claim 1 in which the accumulator is a spring accumulator.

3. A hydraulic actuation system according to claim 1 in which a pressure sensor is provided, a closed feedback loop controlling the pressure of fluid delivered by the pump.

4. A hydraulic actuation system according to claim 1 in which the gear engagement actuator is selectively connected to the main control valve or to the reservoir by means of a gear engagement control valve.

5. A hydraulic actuation system according to claim 1 in which the gear engagement mechanism includes two gear engagement actuators, a select actuator for moving a select member in a first direction and a shift actuator for moving a select member in a second direction, the select and shift actuators having independent select and shift control valves, the select and shift control valves selectively connecting the select actuator and shift actuator respectively, to the main control valve or to the reservoir.

6. A hydraulic actuation system for an automated transmission system comprising:
    a hydraulic clutch actuator for controlling engagement of a clutch;
    a great engagement actuator for controlling engagement of a gear;
    an accumulator:
        an electric motor driven pump, an output of the motor driven pump being connected to the accumulator for charging thereof via a non-return valve, the pressure of fluid supplied by the pump being controlled by the current supplied to the electric motor;
        a main control valve for selectively connecting the accumulator to the hydraulic clutch actuator and/or the great engagement actuator; and
    wherein the gear engagement actuator is selectively connected to the main control valve or to the reservoir by means of a gear engagement control valve;
    wherein the gear engagement control valve is movable between:
        a. a rest position in which a first and second working chamber of the gear engagement actuator and the connection to the main control valve are all connected to the reservoir;
        b. a null position in which the first working chamber of the gear engagement actuator is connected to the main control valve and the second chamber of the gear engagement actuator is closed;
        c. a third position in which the first and second working chambers of the gear engagement actuator are connected to the main control valve and isolated from reservoir; and
        d. a fourth position in which the second working chamber of the gear engagement actuator is connected to the main control valve and the first working chamber is connected to the reservoir.

7. An automated transmission system including a hydraulic actuation system as claimed in claim 6.

8. A hydraulic actuation system for an automated transmission system comprising:

a hydraulic clutch actuator for controlling engagement of a clutch;

a great engagement actuator for controlling engagement of a gear;

an accumulator:
an electric motor driven pump, an output of the motor driven pump being connected to the accumulator for charging thereof via a non-return valve, the pressure of fluid supplied by the pump being controlled by the current supplied to the electric motor;
a main control valve for selectively connecting the accumulator to the hydraulic clutch actuator and/or the great engagement actuator;
wherein the gear engagement actuator is selectively connected to the main control valve or to the reservoir by means of a gear engagement control valve; and
wherein the main control valve comprises a spool slidably mounted in a bore, the spool having three circumferential lands which sealingly engage the bore, an inlet being provided to the bore for connection to the source of hydraulic fluid under pressure, an outlet from the bore being connected to the reservoir;
a first port open to the bore, the first port being connected to the gear engagement control valve and a second port opening to the bore, the second port being connected to the clutch actuator:
in a first position of the spool, the first port being isolated from the inlet and outlet and the second port being connected to the outlet;
in a second position of the spool, the first port being connected to the inlet and the second port being connected to the outlet;
in a third position of the spool, the first and second ports being connected to the inlet; and
in a fourth position of the spool, the first port is connected to the inlet and the second port is isolated from both the inlet and the outlet.

9. A hydraulic actuation system according to claim 8 in which the bores of the main control valve and the bores of the gear engagement control valve are formed in a common housing, interconnection between the main control valve and the gear engagement control valve being provided by passageways through the housing.

10. A hydraulic actuation system for an automated transmission system comprising:

a hydraulic clutch actuator for controlling engagement of a clutch;

a great engagement actuator for controlling engagement of a gear;

an accumulator:
an electric motor driven pump, an output of the motor driven pump being connected to the accumulator for charging thereof via a non-return valve, the pressure of fluid supplied by the pump being controlled by the current supplied to the electric motor;
a main control valve for selectively connecting the accumulator to the hydraulic clutch actuator and/or the great engagement actuator;
wherein the gear engagement actuator is selectively connected to the main control valve or to the reservoir by means of a gear engagement control valve; and
wherein the gear engagement control valve comprises a spool slideably mounted in a bore, the spool having three circumferential lands which sealingly engage the bore, an inlet being provided to the bore for connection to the main control valve;
an outlet being provided from the bore for connection to the reservoir; and
a first port opening to the bore, the first port being connected to a first working chamber of the gear engagement actuator;
the spool having an axial bore opening to one end of the spool, the axial bore connected with a cross-bore opening between first and second lands of the spool:
in a rest position of the spool, the inlet being connected to the outlet via the cross-bore and axial bore and the first port being connected to the outlet between adjacent lands on the spool;
in a null position of the spool, the first port being closed and the inlet being isolated from the outlet;
in a third position of the spool, the first port being connected to the inlet and isolated from the outlet; and
in a fourth position of the spool, the first port connected to the outlet, the inlet being isolated from the first port and the outlet.

11. A hydraulic actuation system according to claim 10 in which the gear engagement actuator comprises a double-acting ram having a position, the working area on one side of the piston being greater than that of the other side of the piston, the first port of the gear engagement valve being connected to the side of the piston with the larger working area, the side of the piston with the smaller working area being connected directly to the main control valve.

12. A hydraulic actuation system according to claim 11 in which bores for the or each gear engagement actuator are formed in the common housing, the interconnections between the gear engagement control valves and the gear engagement actuators also being provided by passageways in the common housing.

* * * * *